(No Model.) 3 Sheets—Sheet 1.
E. W. SWEIGARD.
CAMERA.
No. 393,729. Patented Nov. 27, 1888.
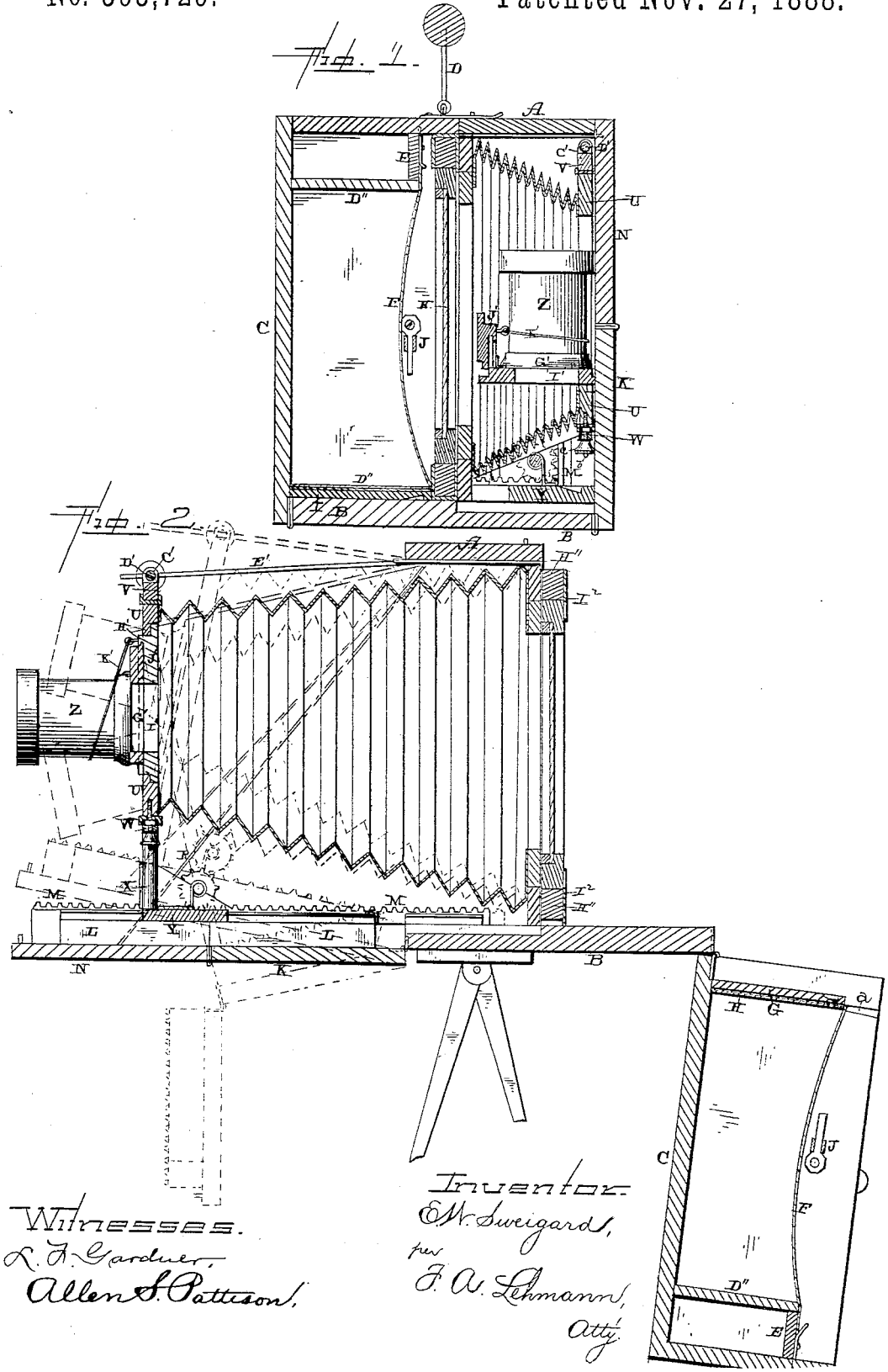
Witnesses.
L. F. Gardner
Allen S. Pattison
Inventor.
E. W. Sweigard,
per F. A. Lehmann,
Atty.

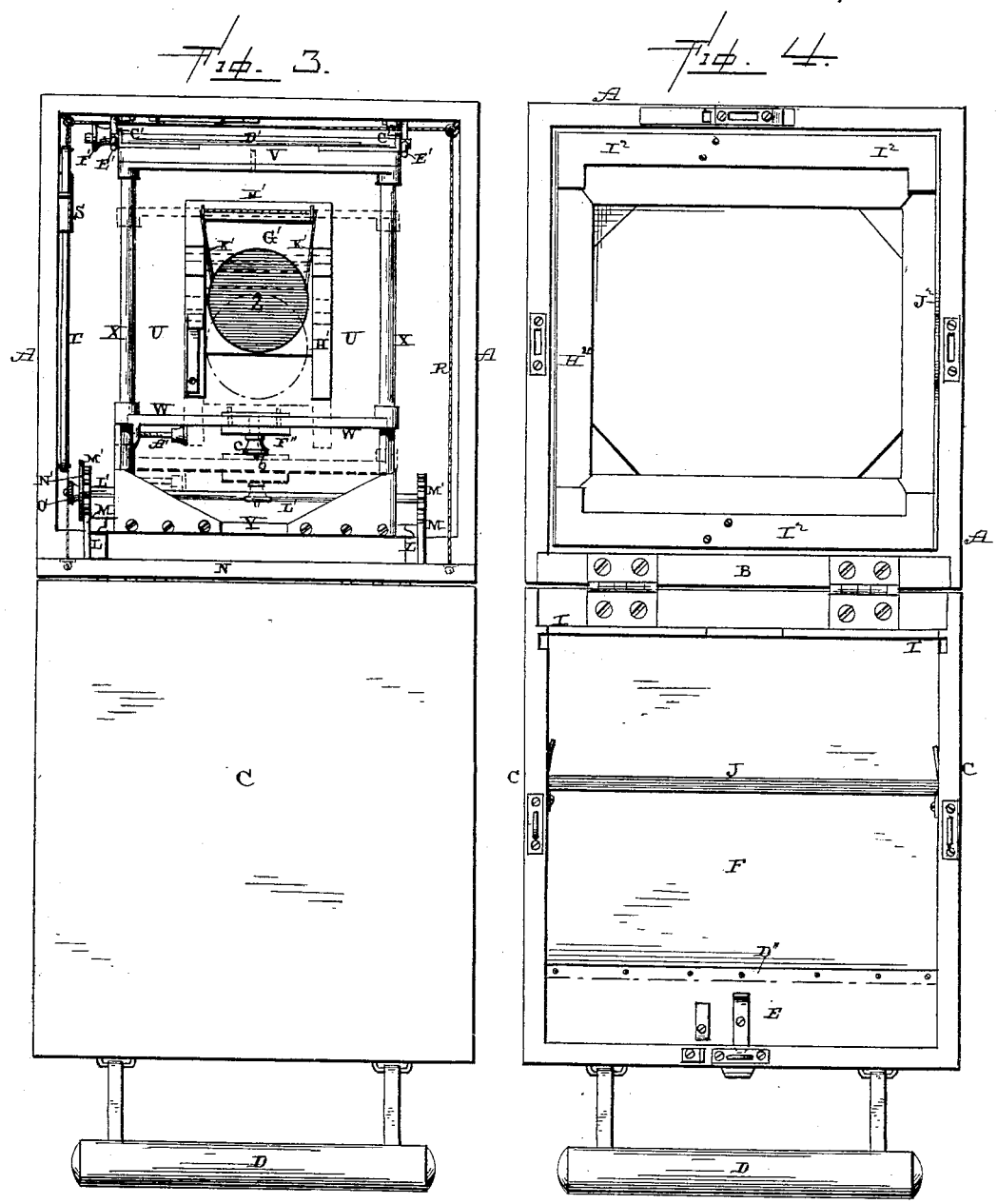

(No Model.) 3 Sheets—Sheet 3.
E. W. SWEIGARD.
CAMERA.
No. 393,729. Patented Nov. 27, 1888.
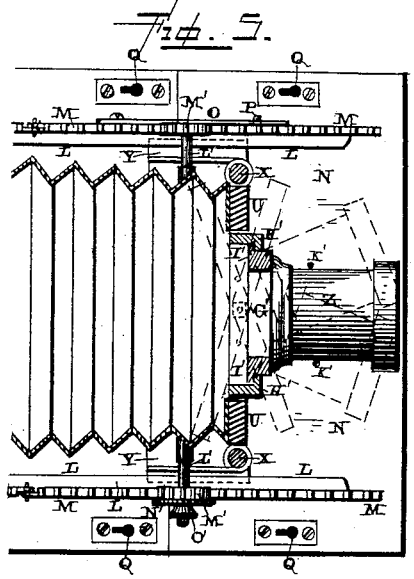
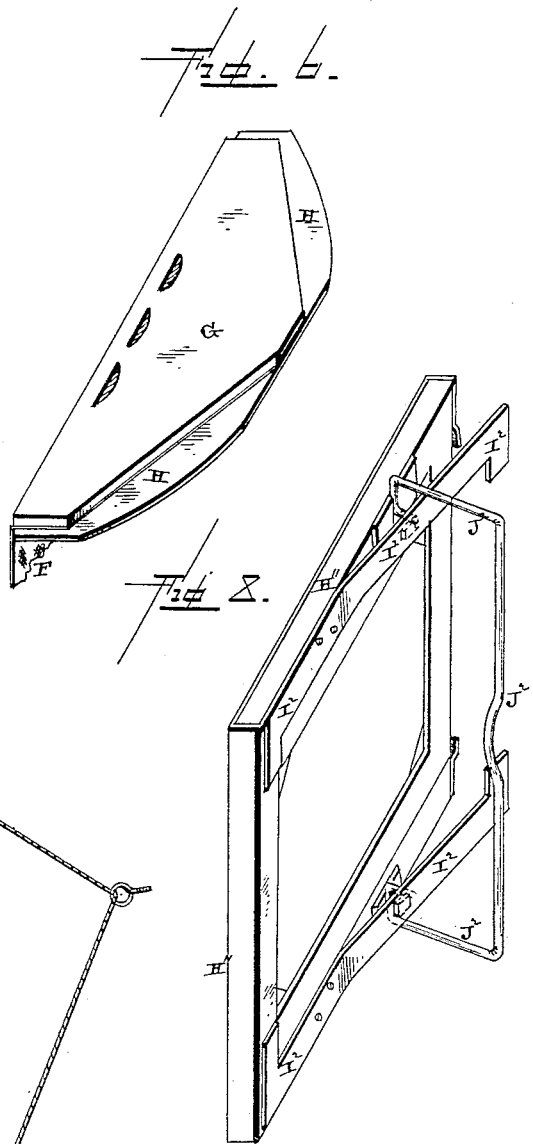
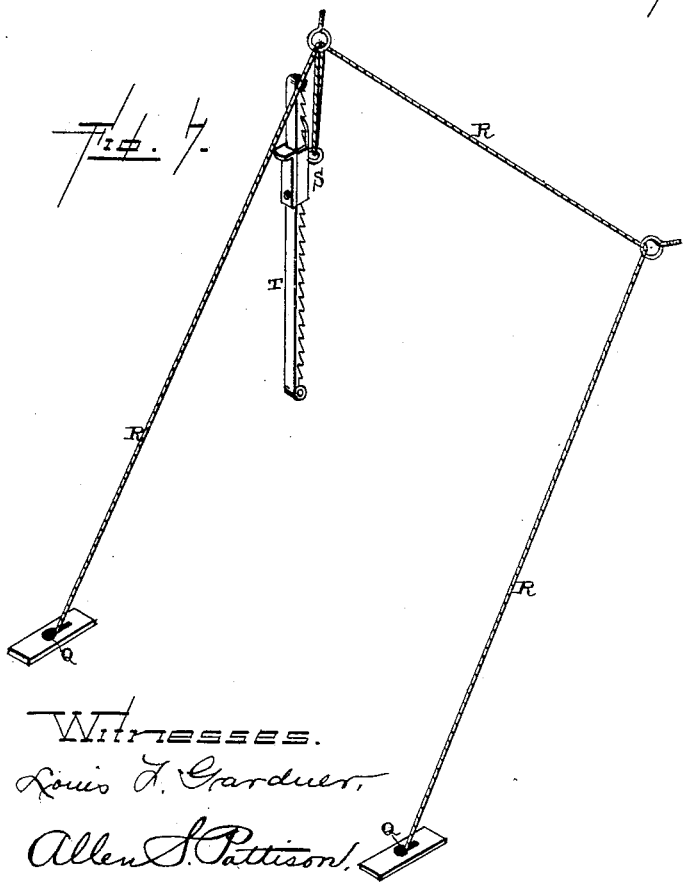
Witnesses.
Louis T. Gardner,
Allen S. Pattison.
Inventor.
E. W. Sweigard,
per F. A. Lehmann,
Atty.

UNITED STATES PATENT OFFICE.

EMANUEL W. SWEIGARD, OF OBERLIN, PENNSYLVANIA.

CAMERA.

SPECIFICATION forming part of Letters Patent No. 393,729, dated November 27, 1888.

Application filed June 1, 1888. Serial No. 275,724. (No model.)

*To all whom it may concern:*

Be it known that I, EMANUEL W. SWEIGARD, of Oberlin, in the county of Dauphin and State of Pennsylvania, have invented certain new and useful Improvements in Cameras; and I do hereby declare the following to be a full, clear, and exact description of the invention, such as will enable others skilled in the art to which it pertains to make and use it, reference being had to the accompanying drawings, which form part of this specification.

My invention relates to an improvement in cameras; and the objects of my invention are to construct the parts of the camera in such a manner that it can be closed into a very small space for transportation; to place the grooved guides or ways upon which the lens end of the camera moves upon a folding door which is adapted to be raised and lowered, and thus enable the lens to be raised and lowered according to the photograph which is to be taken; to lock the lens end of the camera in position at both its upper and lower edges, so that it cannot vibrate or be shaken in windy weather;
to attach the lens to a door which can be closed into the body portion of the camera, carrying the lens with it, so as to get it out of the way when the camera is to be packed for transportation; to pivot the lens end in the camera so that it can be turned partially around; to make the door upon which the lens end of the camera moves in two parts, one of which is adapted to be dropped downward at right angles to the other, and to provide the frame which holds the ground glass with holding springs and a lever by which the springs can be operated.

Figure 1 is a vertical section of the camera with the parts closed for transportation. Fig. 2 is a vertical section with the parts in position ready for use. Figs. 3 and 4 are end views taken from opposite ends, the camera being open ready for use. Fig. 5 is a horizontal section taken through the front end of the camera. Fig. 6 is a detached view of the slide and cloth attached thereto. Fig. 7 is a detached perspective view of the devices for supporting the doors in position. Fig. 8 is a perspective of the frame for holding the groundglass holder, the springs being shown opened outward.

A represents the body or central portion of the frame, which has its bottom piece, B, to project a suitable distance beyond its rear end, and to the outer edge of this bottom piece, B, is hinged the box C, in which the plates and the tools are carried, and to which box C the handle D is secured. While the camera is in use this box hangs vertically, as shown. In this box is placed the partition D'', which is provided with a cover, E, and secured to this partition and cover is the cloth F, which has the slide G secured to its outer end. This cloth is not connected at its edges to the sides of the box C, but is connected to the slide G at its free end only, and this slide fits in grooves *a*, made in the inner side of the box, so as to hold it in position. In order to prevent all possibility of light being admitted to the plates which are secured in this box, the slide G has the metallic plates H secured to it, and this plate covers over the joint between the slide and the partition I, which is formed partially across the upper end of the box. In order to prevent the plates from forcing the cloth too far outward, a rubber band or other suitable spring, J, is stretched across the box, as shown, so as to support the cloth at or near its center.

The front end of the frame A is closed by the door K, which is made in two parts, and secured to the inner side of this door are the grooved ways or guides L, which are jointed at the same point that the door K is divided, and secured to these ways or guides L are racks M, which are divided at the same point where the ways or guides are divided, so that when the outer portion, N, of the door K is dropped downward that portion of the ways or guides L and the racks M, which are secured to it, will be dropped down at the same time. The two parts of the door are secured in a horizontal position by means of a flat spring, O, which catches at one end over a projection, P, which is secured to the outer side of the jointed part of the guide or way L. When it is desired to drop the portion N of the door K, it is only necessary to disconnect this spring O from the projection P, when the part N of the door can be dropped, while the other portion remains in a horizontal position. The racks M are jointed at the inner ends of the ways or guides L at the inner edge of the door K, so that when the door is closed the jointed parts of the racks will be moved into the bottom of the box or frame A, as shown. If these racks were not jointed at this point, the door K could not be closed into the position shown in Fig. 1.

The door K is provided at each edge in each of its parts with suitable slots or openings, Q, into which the ends of the supporting cords, wires, or chains R are made to catch. When both parts of the door are being used in a horizontal position, the outer ends of the cord, wire, or chain R are made to catch in the slots in the part N of the door; but when the part N of the door is to be dropped the cords are disconnected from the slots Q in this part, and the ends are then inserted in the inner slots of the door K, and the guide S, which moves upon the vertical rod T, is moved downward, so as to tighten the cords in position. The cord, wire, or chain passes through suitable guiding-eyes inside of the box A, and has its central portion passed through an eye on the slide S. The rod T is ratcheted on its inner side, so that the slide S will be held in any position into which it may be adjusted. To the inner side of the slide is attached a spring, which automatically engages with the ratcheted surface of the rod, and which must be disengaged from the rod before the slide can be moved upward for the purpose of loosening the cord, wire, or chain R.

The inner end of the bellows portion of the camera is secured inside of the frame A, and its outer end is secured to the front end, U, which is pivoted between the two cross-pieces V W, which are provided with tubular slides upon their ends, and which can be adjusted vertically upon the two round uprights X, which are secured at their lower ends to the crosspiece or slide Y, which moves in the grooves in the inner side of the ways or guides L over the top of the door K. The end U, carrying the lens Z, is thus with it given a vertical adjustment upon the uprights X, and is held in any desired position by means of the clamping-screw A'.

The upper ends of the uprights X are rigidly secured together by the cross-piece V, upon the top of which are placed the two guiding-eyes C', through which the clamping-rod D' passes. Through each end of this rod D' is made an opening, through which a clamping-rod, E', passes, and upon one end of the rod is placed a clamping-nut, F', by means of which the rods E' are tightened in position. These rods E' serve to hold the upper portion of the end U rigidly in position, so that it cannot possibly move after the focus has been obtained. The rods also serve as guides for the movement of the front end, U, and prevent it from getting out of line as it is moved back and forth.

The end U is pivoted between the two cross-pieces V W, so that it can be turned partially around upon its pivots, and thus turn the lens at a slight angle, to be used in taking a picture of a long building from one end. By turning the lens at a suitable angle the end of the building farthest away can be made to appear a great deal larger than what it would were the lens not turned at an angle. When the lens is not to be turned at an angle, it is locked in position by means of the screw b, the thumb-nut c, placed thereon, and the block F''', placed upon the screw and provided with projections at its ends which pass up through holes in the cross-piece W and enter the lower edge of the end U, for the purpose of locking it in a line with the cross-pieces V W.

The lens Z is secured to a slide, G', which moves vertically in the guides H', secured to the door I', which closes the opening through the end U, and which door is provided with a circular opening just back of the lens, and through which the operator sees in adjusting the focus. The upper portion, J', of this door I' is hinged thereto, and to the outer side of which is also secured a portion of the guide H', in which the lens and slide G' move. The upper part, J', is hinged to the door I', so that when the camera is to be closed up for transportation this door, carrying the lens with it, can be closed inside of the bellows-like portion of the camera, and thus not only be out of the way, but which enables the camera to be closed up into a very small compass. A suitable spring, K', is connected to the portion J' of the door and to the lens Z, so as to draw the lens upward into its proper position in the door when it is left free to move. When the door I' and the lens are to be closed, the lens Z is forced downward against the tension of the spring until the joint between the parts I' J' is left uncovered, when the part J' will turn up at an angle to the part I', leaving the door and lens to be dropped inward out of the way. When the door and lens are to be returned to position, it is only necessary to catch hold of the lens, draw outward upon it until the door I' J' has been raised into a vertical position, and then the slide G', connected to the lens, is raised upward until it strikes the top at the upper end of the guide H', when it will be held in position by means of the spring. When the door I' J' is closed, all light from the interior of the camera is effectually cut off.

The slide Y moves horizontally in the grooves in the inner side of the way or guides L and carries the end U of the camera with it. Journaled upon the top of this slide Y is the shaft L', which has secured to each of its ends a toothed wheel, M', which engages with the rack M, and which shaft, as it is made to revolve by pressure applied to the milled disk N', placed upon one end of the shaft and secured to one of the wheels, causing the end U to move back and forth at the will of the operator. After the desired focus has been obtained, the slide Y is locked in position, by means of the nut O', upon one end of the shaft L'. The end U, being locked in position both above and below, cannot possibly be made to vibrate or shake during windy or stormy weather, nor can it become accidentally deranged. When a very short focus lens is to be used, the outer part, N, of the door K can be dropped downward, so as to be entirely out of the way, as shown.

Before the slide Y can be moved out of the frame A the door K must be in a horizontal position, so as to bring the grooved guides L in a line with the slide Y; but after the ends of the slide Y have entered the grooved guides or ways L the end U, carrying the lens Z, can be adjusted either up or down by raising or lowering the door K, according as it is desired to photograph objects below or above you. If it is desired to photograph objects below, then the door K is slightly lowered, carrying the end U and lens with it, and after the focus is obtained the parts may be locked in position by means of the rod D' upon the top of the cross-piece B', the rods E', and the clamping-nut, and by raising the slide S upon the ratcheted rod T. If it is desired to photograph high buildings, steeples, or other such objects, the door K, carrying the end U, and the lens are correspondingly raised.

The frame H", to hold the ground glass, is made reversible in the rear end of the frame A, so that the glass can be turned so as to extend in either direction, and this glass is held in position in the frame by means of the flat springs I², which are secured to the frame at or near their middle. The upper ends of these springs can be opened outward, as shown, by merely turning the U-shaped lever J² outward, the ends of the lever being turned at an angle, so as to force the springs outward when the lever is turned partially around in its bearings. By means of the lever the springs can be opened and the ground glass detached with one hand.

Having thus described my invention, I claim—

1. The combination of the frame A, having the bottom B, which projects beyond the ground glass upon one side, the box C, connected to the outer edge of this bottom, and which box is adapted to be closed up over the top of this projecting portion of the bottom, the camera provided with a slide, and the door K N, provided with ways or guides in which the slide moves, substantially as shown.

2. The combination of the frame A, having its bottom piece projecting beyond one side, the box C, hinged thereto and provided with a partition and a cover, with the cloth which is secured to the partition, and the slide G, secured to the free end of the cloth and adapted to move in grooves in opposite sides of the box, substantially as described.

3. The combination of the box C, hinged to the main frame of the camera and provided with a partition, the cloth secured to this partition, the slide G, provided with the metallic plates H, the partitions I, which extend partially across the frame, and the support J for the cloth, substantially as set forth.

4. The combination, with the frame H", flat springs secured to its outer side, the lever having bent ends for operating the springs, and the ground-glass holder, substantially as specified.

5. The combination of the frame A, the hinged door connected thereto, the grooved guides or ways secured to the door, the slide Y, carrying the front end of the camera, the shaft mounted upon the slide and provided with pinions to engage with the racks upon the guides, and the locking-nut and disk upon the shaft, substantially as described.

6. The combination of the door K, provided with the hinged portion N, the ways or guides secured to the door and made in sections, the spring O, for securing the two parts to the door in a line with each other, and the recess Q, to receive the ends of the supporting cords, chains, or wires, substantially as set forth.

7. The combination, with the frame A, the door hinged thereto and provided with the recesses Q, the supporting cord, wire, or chain, guiding eyes or loops inside of the frame, a vertical rod secured inside of the frame, and a slide moving upon the rod and having a cord, wire, or chain secured thereto, substantially as specified.

8. The combination, in a camera, of the slide to which its outer end is attached, the hinged door, the guides or ways in which the slide moves, the rods which guide the upper edge of the front end of the camera, and the guiding rod or shaft through which these rods pass, substantially as shown.

9. The combination of the frame A, the hinged door connected thereto, the guides or ways secured to the door, the racks placed upon the guides, the slide carrying the front end of the camera, a locking-shaft provided with pinions journaled upon the slide, pivoted rods which guide and make rigid the upper edge of the front end of the camera, and the shaft through which the rods pass, whereby the camera is locked in position at both its upper and lower edges, substantially as described.

10. The combination of the front end of the camera with the lens secured to a slide and a folding door provided with guides or ways in which the slide moves, the door being adapted to fold inside of the front end of the camera carrying the lens vertically, substantially as set forth.

11. The combination of the front end of the camera, the door made in two parts and hinged thereto, the guides or ways secured to the outer side of the door, the slide to which the lens is secured, and a spring for drawing the slide and lens upward in the guides, substantially as specified.

In testimony whereof I affix my signature in presence of two witnesses.

EMANUEL W. SWEIGARD.

Witnesses:
A. E. BRANDT,
JOS. H. NISLEY.